May 21, 1963  G. E. HIEBER ETAL  3,090,499
PIPE HANDLING TABLE

Filed Sept. 10, 1959  5 Sheets-Sheet 1

INVENTORS
GEORGE E. HIEBER
ARTHUR H. BILLOW
BY
ATTORNEY

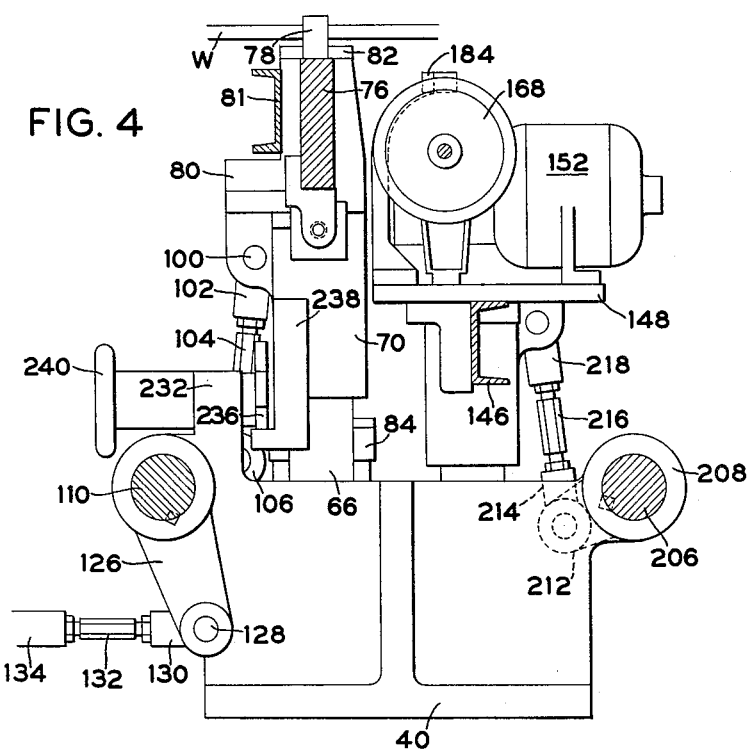
FIG. 4
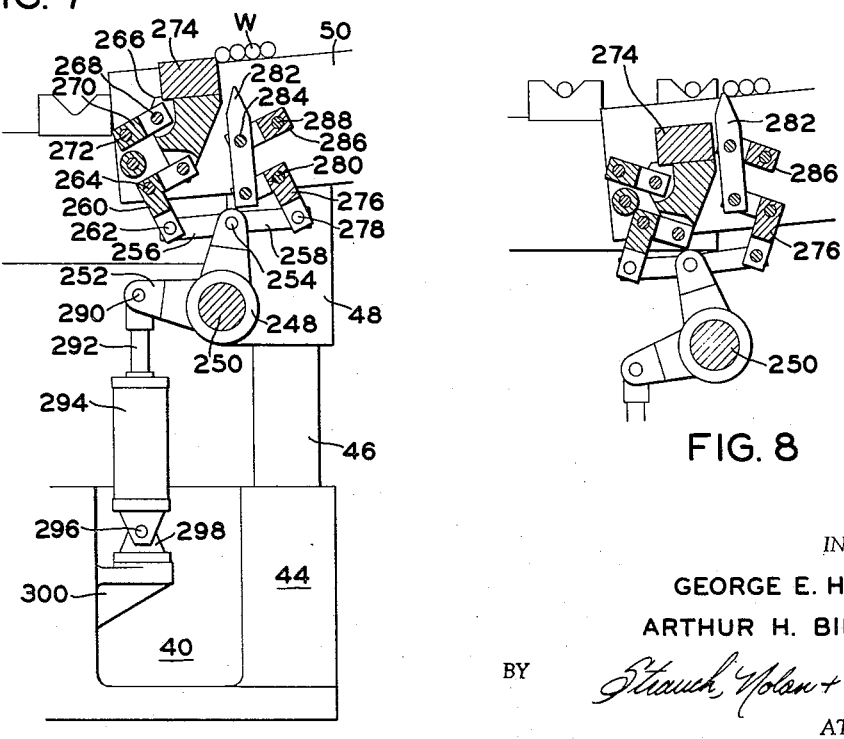
FIG. 7
FIG. 8
INVENTORS
GEORGE E. HIEBER
ARTHUR H. BILLOW
ATTORNEYS

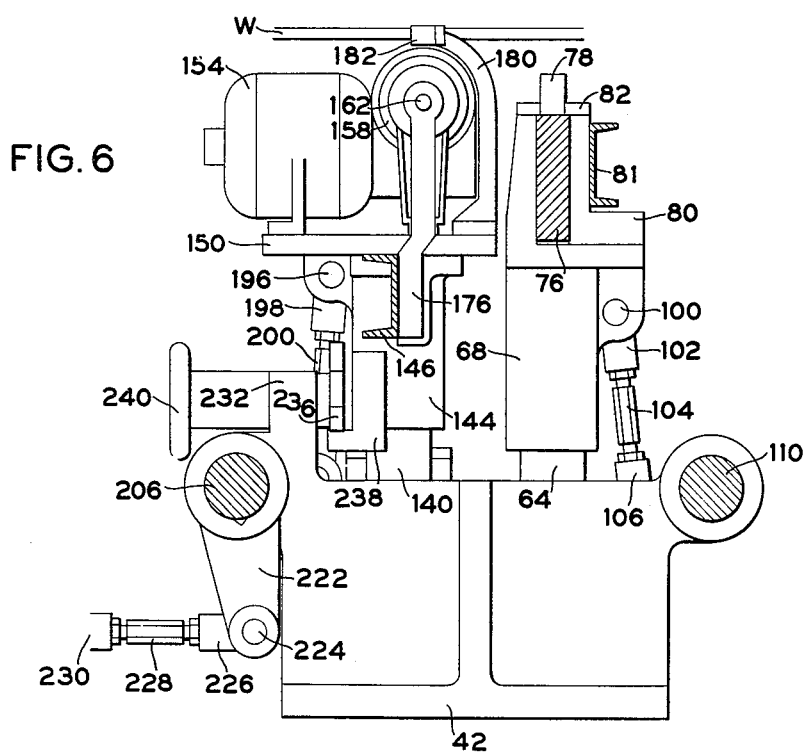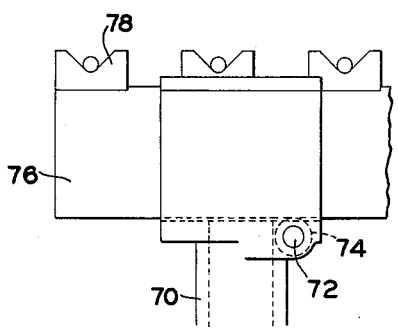

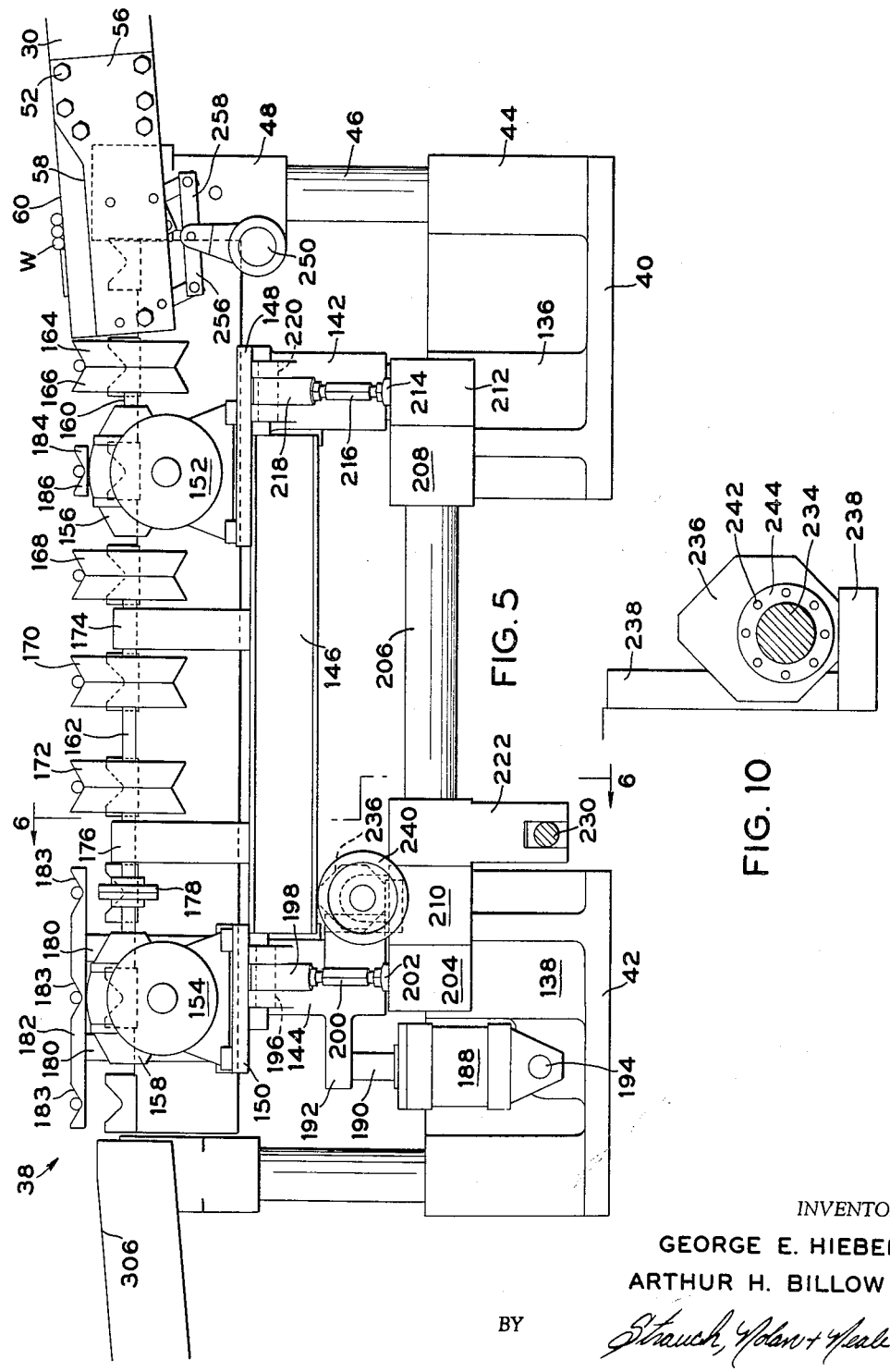

United States Patent Office 3,090,499
Patented May 21, 1963

3,090,499
PIPE HANDLING TABLE
George E. Hieber and Arthur H. Billow, Waynesboro, Pa.,
assignors to Landis Machine Company, Waynesboro,
Pa., a corporation of Pennsylvania
Filed Sept. 10, 1959, Ser. No. 839,225
5 Claims. (Cl. 214—1)

This invention relates to work handling equipment for metal-working machines and particularly to that class of equipment commonly known as pipe handling tables employed to transfer elongated work pieces axially then laterally to position first one end of the work pieces and then the other to machine tools for performing various machining operation upon the ends of the work pieces.

A mechanism of this general type is shown and described in United States Patent 2,690,572, granted October 5, 1954. In that mechanism the work pieces are, as usual, disposed in parallel relationship upon a series of groups of indented rollers, some of which groups are driven rotatively for transporting the work pieces axially. The work pieces are transferred laterally from one group of rollers to the next adjacent group by means of carrier plates which lift them bodily from the indentations in one group of rollers through an arcuate path to deposit them in the indentations in the next group of rollers. The carrier plates are moved in unison in a circular path, approximately one-half of which represents the active working stroke, the other half the idle return stroke.

In accordance with the present invention the portion of the cycle time devoted to actually transferring the work piece laterally has been reduced by about 25% by employing novel mechanism for effecting the transfer movement in a straight line rather than a circular arc. Since no other part of the entire combination of handling table and machining units can operate during the transfer, such reduction in transfer time substantially reduces the total cycle time and hence the expense of machining each work piece.

Also, in the machine of the present invention, the work pieces are not lifted during the transverse or lateral transfer but are simply carried in a horizontal plane. Accordingly the power requirements for this operation are substantially reduced, especially for the larger sizes of work pieces. Further, the novel means of the present invention for effecting the lateral transfer eliminates the heavy crank mechanism of the prior machine, thus further reducing the power requirements, minimizing the number of wearing elements and lowering the first cost of the mechanism.

In all mechanisms of this same class it is desirable to transfer the work pieces laterally without permitting them to roll, at least between the station at which the accurate axial position of the work piece has been established and the station at which a machining operation is to be performed, because rolling alters such axial position as fully explained in United States Patent 2,758,696, granted August 14, 1956. While the mechanism of that patent effectively eliminates rolling of the work piece, the device of the present invention has the advantage thereover of eliminating literally hundreds of individual parts, thus greatly reducing wear and minimizing maintenance costs.

The invention also comprises an ingenious and novel means for adjusting the operation of the mechanism to accommodate various sizes of work pieces and to deliver them, regardless of size, to the fixed locating and machining stations.

Accordingly it is an object of the invention to provide a mechanism for delivering elongated work pieces to machine tools automatically, in which the lateral transfer of the work pieces from one station to the next takes place in a straight line, while said work pieces are not permitted to roll.

It is another object to provide means for the above mechanism which will transfer the work pieces without lifting them but will carry them in a horizontal plane without the use of continuous chains or the like.

A further object is to provide means for adjusting the above mechanism to accommodate various pipe sizes without replacement of major parts.

Further objects and advantages will be apparent from the following description of an exemplary embodiment of the invention and from the accompanying drawings in which:

FIGURE 4 is a sectional view along line 4—4 of FIGURE 3;

FIGURE 5 is a side elevation of another stand of the table taken in the direction of arrows 5—5 of FIGURE 1 showing the side opposite to that shown in FIGURE 3 and showing the roller group in engagement with the pipe and the carrier plate lowered;

FIGURE 6 is a sectional view along line 6—6 of FIGURE 5;

FIGURE 7 is a sectional view along line 7—7 of FIGURE 2, showing the escapement mechanism;

FIGURE 8 is a view similar to a portion of FIGURE 7, showing the other limiting position of the escapement mechanism;

FIGURE 9 is a side elevation of one end of the carrier plate mounting, showing the bearing therefor; and FIGURE 10 is a sectional view along line 10—10 of FIGURE 4, showing the mechanism for adjusting the rise of the carrier plate and the roller group.

Figure 1:
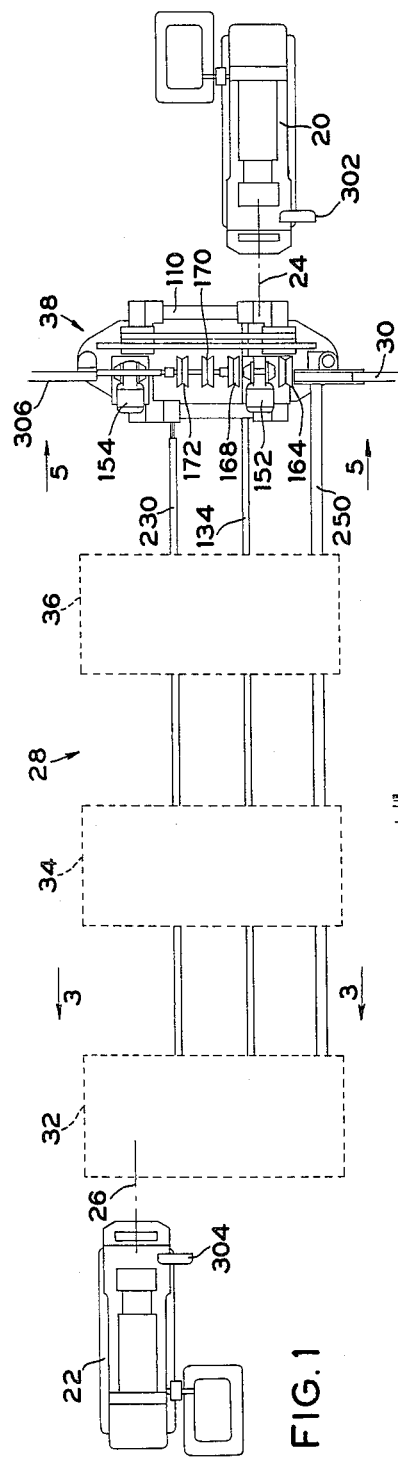
FIGURE 1 is a top plan view of the pipe handling table of the invention showing it in association with two metal working machines, one of which operates on one end of the work pieces and the other of which operates on the opposite end of the work pieces after they have been laterally and axially shifted.

In FIGURE 1 are shown two metal-working machines 20 and 22 for performing machining operations such as threading operations upon the opposite ends of an elongated work piece, for example a length of pipe. The working stations 24 and 26, respectively, of the machines 20 and 22 are spaced apart so that the machines do not operate simultaneously upon the same piece of pipe. The handling table, indicated generally by 28 is employed to transfer each work piece laterally from entrance skids 30 (FIGURES 2 and 5) to work station 24 and then to work station 26. The table also locates each work piece axially in position to be operated upon by the machine 20 and then transfers it axially to a position to be operated upon by the other machine 22, all as will be explained in more detail hereinafter.

The table 28 comprises four stands 32, 34, 36, 38 each of which supports one carrier plate for lateral transfer of the work pieces and one roller group for their axial transfer. It will be understood that the arrangement shown in FIGURE 1 is illustrative only and that more or fewer stands may be employed as the size and range of work pieces to be handled may require. Similarly more than two machines may be served by the same table. For example one machine for facing and chamfering the pipe may be placed side by side at one end of the table with a threading machine and the table may be arranged to deliver the work pieces to both working stations at each end of the work pieces.

Figure 2:
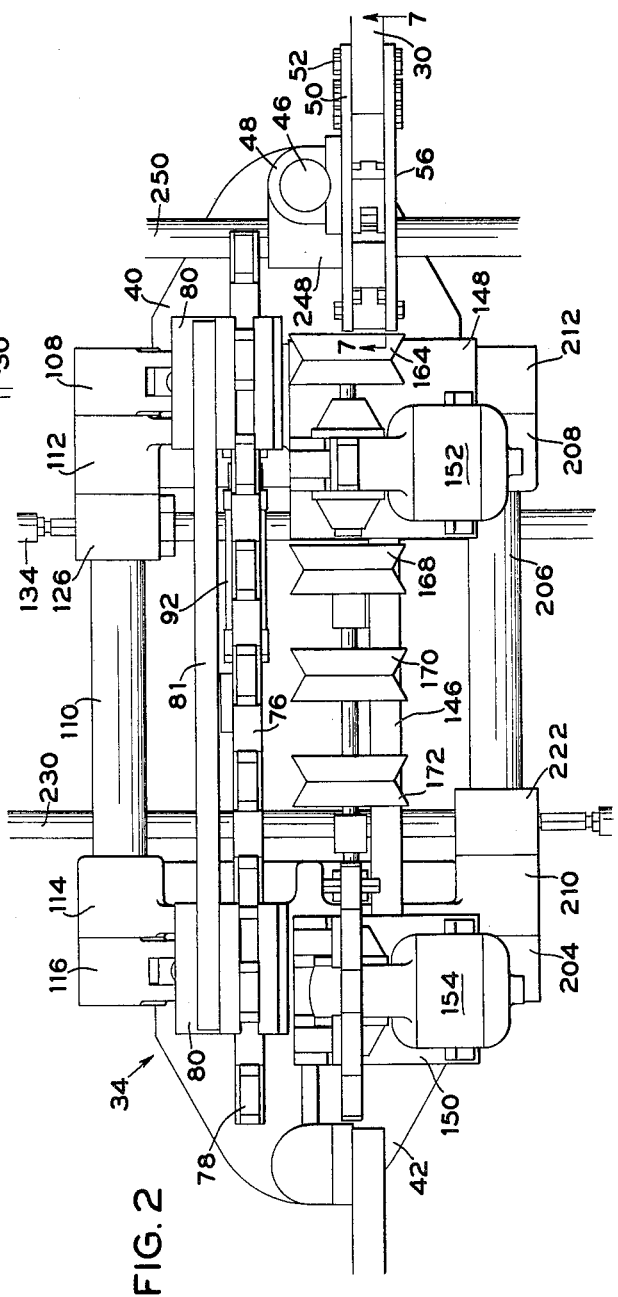
FIGURE 2 is a top plan view of one stand of the table comprising a carrier for transferring the pipe laterally and a group of indented rollers for transferring the pipe axially.

A typical stand 34 is shown in plan view in FIGURE 2 and comprises a pair of bases 40 and 42 also shown in FIGURES 3–7. Each of the bases 40 is provided with a boss 44 for supporting a vertical post 46. At the top of each post 46 is attached a bracket 48 to which may be secured a plate 50. The plate 50 is attached by bolts 52 to the end of an entrance skid 30 (FIGURE 2). As shown in FIGURES 2 and 5, a plate 56 is also secured to skid 30 by the bolts 52 on the side opposite to plate 50. Both plates 50 and 56 extend beyond the end of the skid 30 toward the bracket 48, leaving a space between said plates to be occupied by an escapement mechanism to be described later. Each of plates 50 and 56 is cut away at the top as shown at 58 and the space so provided is occupied by a replaceable insert 60 whose size is dependent upon the size of the pipe to be handled.

Figure 3:
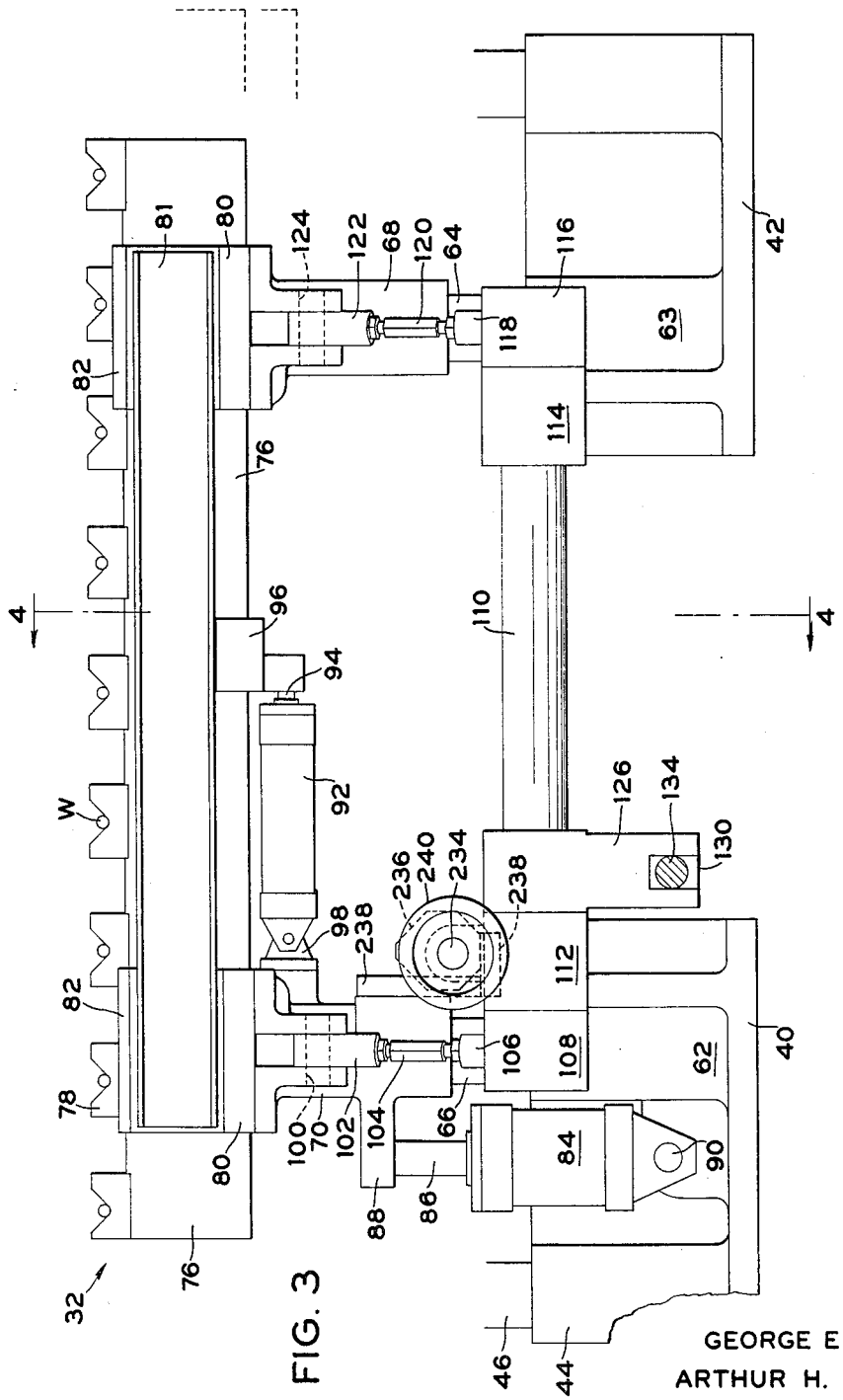
FIGURE 3 is a side elevation of one stand of the table showing the carrier plate in engagement with the pipe and showing the roller group lowered, the elevation being taken in the direction of arrows 3—3 of FIGURE 1.

As best shown in FIGURE 3, bases 40 and 42 are provided with bosses 62 and 63 to support respective vertical posts 64 and 66. On the top ends of posts 64 and 66 are mounted a pair of brackets 68 and 70, respectively, each of which has a transverse pin 72 embedded therein (FIGURE 9). Bearings 74 surround each pin 72 and upon the two bearings 74 is supported a carrier plate 76 (FIGURES 3, 4, 9) extending virtually the entire length of the stand and having attached to the top thereof a number of uniformly spaced V-blocks 78 for engaging the work pieces W. The carrier plate 76 is retained in the upright position shown by means of a pair of brackets 80 screwed to the brackets 68 and 70. The carrier plate 76 is also secured against upward movement relative to brackets 68, 70 and 80 by means of plates 82 screwed to the top surfaces of each of the brackets. The brackets 80 may be connected by a channel-iron 81 bolted to both.

The assembly comprising brackets 68, 70 and 80, carrier plate 76, etc. is designed to be raised and lowered upon the posts 64 and 66, this movement being accomplished by a hydraulic cylinder 84 (FIGURE 3) whose piston rod 86 is attached to an arm 88 of the bracket 70 and whose head end is pivotally attached at 90 to the base 40. The carrier plate 76 is also capable of longitudinal movement upon its bearings 74 and between the upstanding portions of brackets 68, 70 and 80. This longitudinal movement is effected by a hydraulic cylinder 92 whose piston rod 94 is attached to a bracket 96 which may be screwed to the carrier plate 76. The head end of cylinder 92 is pivotally mounted on a bracket 98 screwed to the bracket 70. Preferably cylinders 92 are also mounted on each stand and are connected in the hydraulic system for simultaneous operation.

The bracket 70 has a pin 100 (FIGURE 4) mounted therein to support a toggle 102 which is directed generally downward and is connected by a turnbuckle 104 to a similar toggle 106 mounted on a lever 108. The lever 108 is keyed upon a shaft 110 journalled through bosses 112 and 114 which are formed integrally with bases 40 and 42 respectively. A second lever 116 is keyed upon shaft 110 adjacent the boss 114 and has attached thereto a toggle 118. The toggle 118 is connected by means of a turnbuckle 120 to a similar toggle 122 which is attached to the bracket 68 by a pin 124. Thus the motion of cylinder 84 is transmitted through bracket 70, toggles 102 and 106, lever 108, shaft 110 and toggles 118 and 122 to the bracket 68, so that the brackets 68 and 70 of the same stand are raised and lowered in unison.

A third lever 126 (FIGURES 3 and 4) is keyed upon shaft 110 and has at its outer end a pin 128 supporting a toggle 130. The toggle 130 is connected by a turnbuckle 132 to a rod 134 which extends to the next adjacent stand to a similar connection with the shaft 110 of that stand. By this means a single cylinder 84 may be used to rock several shafts 110 and to raise and lower the brackets 68 and 70 in several stands simultaneously. In the example shown a cylinder 84 is mounted in the stand 32 and serves for all four stands, it being understood that as many cylinders 84 may be installed as necessary. It will further be noted that the rods 134 connecting the levers 126 are in tension to perform the lifting function.

FIGURES 5 and 6 show the stand 38 which is located at the end of the table opposite to the stand 32 shown in FIGURES 3 and 4. Furthermore the opposite side of the stand is shown in FIGURES 5 and 6 to illustrate clearly the mechanism for transferring the work pieces axially from one end of the table to the other. As is evident from those figures the bases 40 and 42 are provided with a third pair of bosses 136 and 138 respectively each of which is laterally opposite one of the bosses 62 and each of which supports a vertical post 140. Upon the posts 140 are mounted a pair of brackets 142 and 144 which are connected by a channel iron 146. Motor bases 148 and 150 are secured to the top surfaces of brackets 142 and 144, respectively, to provide a support for roll drive motors 152 and 154, respectively.

Motors 152 and 154 are geared motors and are provided with gear boxes 156 and 158 respectively for reducing the speed of the respective output shafts 160 and 162. The output shaft 160 of motor 152, which is located at the entrance side of the table 28, carries a roller 164 having a V-shaped indentation 166 for the reception of work pieces from the entrance skids 30. The other shaft 162 carries three similar rollers 168, 170 and 172, uniformly spaced and with their indentations aligned with those of the V-blocks 78 when the carrier plate 76 is at either end of its travel. The shaft 162 is supported by a pair of bearing brackets 174 and 176 which, as shown in FIGURES 5 and 6, may be secured to the channel 146. Due to its length, shaft 162 may be of two sections joined by a coupling 178.

A pair of brackets 180 is secured to the top surface of motor base plate 150 and extend upwardly therefrom to support above the motor 154 a work rest bar 182 which, in this instance is sufficiently long to accommodate three indentations 183 for work pieces. These indentations are also uniformly spaced and are aligned with those of the V-blocks 78. Above the motor 152 a block 184 having a single indentation 186 is supported by a bracket similar to brackets 180 and resting upon the motor base plate 148. It should be noted in passing that the indentations located directly above the motors 152 and 154 are aligned with the working stations 24 and 26 respectively of the machines 20 and 22.

The brackets 142 and 144 are adapted to be raised and lowered upon the posts 140, a function which is effected by a hydraulic cylinder 188. The piston rod 190 of that cylinder is connected to an arm 192 of bracket 144 while the head end thereof is pivotally attached to the base 42 by means of a pin 194. The bracket 144 has a pin 196 (FIGURE 6) mounted therein to support a toggle 198 which is directed generally downward and is connected by a turnbuckle 200 to a similar toggle 202 mounted on a lever 204. The lever 204 is keyed upon a shaft 206 journalled through bosses 208 and 210 which are formed integrally with bases 40 and 42 respectively. A second lever 212 is keyed upon shaft 206 adjacent the boss 208 and has attached thereto a toggle 214. The toggle 214 is connected by means of a turnbuckle 216 to a similar toggle 218 which is attached to the bracket 142 by a pin 220. Thus the motion of the piston of cylinder 188 is transmitted through bracket 144, toggles 198 and 202, lever 204, shaft 206 and toggles 212 and 218 to the bracket 142 so that the brackets 142 and 144 of the same stand are raised and lowered in unison.

Another lever 222 (FIGURE 5) is keyed upon shaft 206 and has at its outer end a pin 224 supporting a toggle 226 connected by a turnbuckle 228 to a rod 230 which extends to the next adjacent stand to a similar connection with the shaft 206 of that stand. By this means a single cylinder 188 may be used to rock several shafts 206 and to raise and lower the brackets 142 and 144 in several stands simultaneously. In the example shown a cylinder 188 is mounted in the stand 38 and serves for all four stands, it being understood that as many cylinders 188 may be installed as necessary. It will further be noted that the rods 230 connecting the levers 222 are in tension to perform the lifting function.

A device is provided to adjust the lifting stroke of the cylinder 188 (FIGURES 5, 6 and 10) and comprises a boss 232 formed integrally with the base 42 and having a central bore directed transversely to the shaft 206. A shaft 234 is mounted in said bore and has keyed thereon an adjusting block 236 of polygonal shape, the numerous sides of which are at various distances from the center of rotation. One of the sides of block 236 is set to engage a bracket 238 which is secured as by screws to a side of the bracket 144. Such engagement by the bottom surface of block 236 with an upwardly directed surface of the bracket 238 limits the upward stroke of the cylinder 188. Rotation of block 236 to present another of its peripheral surfaces to the bracket 238 will limit the stroke of cylinder 188 to a greater or lesser extent and so adjust said stroke according to the work piece requirements. The block 236 may be rotated by a handwheel 140 also keyed to the shaft 234. A detent may be provided in the boss 232 to engage one of the axially directed holes 242 (FIGURE 10) in the hub 244 of the block 236 so as to retain the block in adjusted position against displacement by accident or vibration. A similar device, designated by the same reference numerals and shown in FIGURE 3 is mounted on the base 40 to adjustably limit the stroke of the cylinder 84 and the lift of the carrier plate 76.

An escapement mechanism is provided to allow only one work piece at a time to leave the entrance skids 30 and to retain the remaining work pieces on the skids. This escapement mechanism is mounted between the above-mentioned plates 50 and 56 and is shown in detail in FIGURES 7 and 8. The bracket 48 is provided with a boss 248 having a horizontal bore to receive a shaft 250 to which is keyed a bell crank lever 252. The upper arm of lever 252 is bifurcated and has a pin 254 passed therethrough to connect thereto a pair of links 256 and 258.

One arm of a second bell crank lever 260 is secured to the free end of link 256 by means of a pin 262. The lever 260 is rotatably journalled upon a pin 264 extending between the plates 50 and 56 and the other arm of this lever is pinned to a member 266. The member 266 is also fastened by a pin 268 to a lever 270 which, like lever 260, is rotatably journalled upon a pin 272 extending between the plates 50 and 56. A block 274 is secured to the top of member 266. When the lever 252 is rotated to its clockwise limit (FIGURE 7) the block 274 prevents the series of work pieces W from proceeding down the inclined plates 50 and 56, while when the lever 252 is rotated to its limit in the other direction the block 274 is withdrawn below the level of the top surfaces of the plates and does not interfere with the movement of the work pieces.

One arm of a third bell crank lever 276 is secured to the free end of link 258 by means of a pin 278. The lever 276 is rotatably journalled upon a pin 280 extending between the plates 50 and 56 and the other arm of this lever is pinned to a member 282. The member 282 is also fastened by a pin 284 to a lever 286 formed with a pointed top which, like lever 276, is rotatably journalled upon a pin 288 extending between plates 50 and 56. As lever 252 rotates toward its counterclockwise limit (FIGURE 8) the tip of member 282 is forced between the lowermost two work pieces on plates 50 and 56, freeing one work piece to roll into the end V-block 78 on the carrier plate 76 which completes its upward motion at this time to catch the work piece. In the opposite position of lever 252, the member 282 is withdrawn below the level of the top surfaces of the plates 50 and 56 and the work pieces are held by the clock 274.

The lower arm of lever 252 (FIGURE 7) has secured thereto by a pin 290 the piston rod 292 of a hydraulic cylinder 294. The cylinder 294 may be pivotally attached as by a pin 296 to a base member 298 which is secured to a bracket 300 formed integrally with the base 40. In the embodiment illustrated, an escapement mechanism is installed in each stand, all of the mechanisms being connected for simultaneous operation by means of the shaft 250. It will be understood that, in the stands other than that in which the cylinder 294 is located, the bell crank lever 252 may be replaced by a single-armed lever.

*Operation*

The work handling table is designed for fully automatic operation in conjunction with two or more automatic work-forming machines. Since several methods of accomplishing such automatic operation are known (through U.S. Patent 2,655,670 for example) the details of the operating circuit need not be shown herein.

A quantity of work pieces are placed upon the skids 30 whence they roll onto the top surfaces of plates 50 and 56. The cylinder 294, starting from the position shown in FIGURE 7, is caused to rock the lever 252 in the clockwise direction. This motion, as explained above, will force the member 282 upwardly and will simultaneously withdraw the block 274. At the same time cylinder 294 is being actuated, cylinder 84 is also actuated to raise the V-blocks 78. When the piston rod 86 reaches the end of its stroke after the rod 294 is fully extended, a single work piece is thus freed to roll downwardly on the plates 50 and 56 until it is caught by the end V-block 78 of the carrier plate 76 which thereafter continues to rise to the position shown in FIGURE 8. If larger work pieces were being operated upon, the carrier plate would not have to travel as far in the upward direction.

When the position of FIGURE 8 has been reached the cylinder 92 is operated to convey the work piece to the left as viewed in FIGURES 2 and 5 and to the right as viewed in FIGURE 3 to a position in alignment with the indentations 166 in rollers 164, i.e. to the position shown in full lines in FIGURE 3. At this point the cylinder 188 is operated to bring the motor and roller assembly up beneath the work pieces and as soon as those parts arrive at the fully extended position the cylinder 84 is operated to cause the carrier plate 76 to move downwardly. This position is shown in FIGURE 6. Then rotating rollers 166 carry the work piece axially against an end stop 302 (FIGURE 1) of machine 20. The cylinder 84 is then operated to bring the V-blocks 78 of the carrier plate 76 up to engage the work piece and when this position is reached the cylinder 188 is operated to cause the motors and rollers to be lowered. This position is shown in FIGURE 4 and completes one cycle of the machine.

In the next cycle the first work piece W is brought into alignment with the tools of machine 20 and the machining operation is performed on one end of the work. In subsequent cycles the work piece is transferred laterally onto the rollers 168, 170 and 172 successively, the latter rollers carrying the work piece against an end stop 304 of machine 22 in which axial position it remains until transferred into alignment with the tools of machine 22, where the second machining operation is performed on the other end of the work. It will be evident from the above that the rollers 164 rotate in one direction and that rollers 168, 170 and 172 all rotate in the opposite direction.

After the second machining operation has been performed the work piece is transferred to a point above the exit skids 306 upon which it is deposited by the downward withdrawal of the carrier plate.

It will be seen that during its entire travel past both machining units the work pieces are maintained at a constant elevation, the roller-and-motor assembly or the carrier plate coming up from below to support them when axial or transverse transfer is required, thus obtaining the advantages described above.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Work handling apparatus for transferring elongated workpieces to and from work stations at a predetermined level comprising a plurality of stands positioned in aligned relation between said working stations, sets of rollers mounted on each of said stands for vertical shifting movement between said level and a lower level, means for rotating said rollers to carry a workpiece supported thereon axially toward a working station, a motor on one of said stands, means operatively connecting the rollers on each of said stands to said motor for simultaneous vertical shifting movement between said predetermined level and said lower level, work transfer means mounted on each stand for vertical shifting movement and lateral displacement, and actuating means for sequentially raising said rollers to said predetermined level, raising said work transfer means to said predetermined level, lowering said rollers to deposit a workpiece on said work transfer means, laterally shifting said work transfer means in horizontal straight line motion at said predetermined level, raising said rollers to said predetermined level to engage a workpiece carried by said work transfer means, and lowering said work transfer means whereby said workpiece is constantly maintained at said predetermined level.

2. Work handling apparatus for transferring elongated workpieces to and from work stations comprising a plurality of vertically shiftable sets of rollers, means for rotating said rollers to move a workpiece axially toward said work stations, vertically shiftable support means, work carriers, means mounting said work carriers on said support means for straight line horizontal shifting movement on said support means, actuating means for raising said sets of rollers to the level of said work stations and for lowering said sets of rollers, actuating means for raising said support means to dispose said carriers at said level and for lowering said support means and for laterally shifting said carriers with respect to said support means at said level when said support means are raised and said sets of rollers are lowered to transfer a workpiece in horizontal straight line motion from one of said sets of rollers to a position in alignment with an adjacent set of rollers whereby said workpiece is constantly maintained at said predetermined level.

3. Work handling apparatus for transferring elongated workpieces to and from work stations comprising a fixed stand, a plurality of rollers mounted for vertical shifting movement on said stand, means for rotating said rollers to move a workpiece disposed thereon axially toward said work station, means for raising said rollers to the level of said work stations and for lowering said rollers, support means mounted for vertical shifting movement on said stand, a slide mounted on said support means for horizontal straight line sliding movement thereon, work carriers rigid with said slide, and actuating means for raising said support means to dispose said carriers at the level of said work stations, for lowering said rollers, and for laterally shifting said slide and said carriers when said carriers are raised and said rollers are lowered to thereby transfer a workpiece from one of said rollers to a position in alignment with an adjacent roller in horizontal straight line motion while maintaining said workpiece constantly at the level of said work station.

4. Work handling apparatus for transferring elongated workpieces to and from work stations comprising a plurality of stands positioned in aligned relation between said working stations, sets of rollers mounted on each of said stands for vertical shifting movement between a position at the level of said work stations and a position below said work stations, the rollers of one set being aligned with the corresponding rollers of the other sets, the aligned rollers cooperating to support a workpiece deposited thereon, means for rotating said rollers to carry a workpiece supported thereon axially toward a working station, a support mounted on each stand for vertical shifting movement, a slide carried by each support for horizontal straight line movement, work transfer means carried by each slide having work supporting surfaces, the work supporting surfaces of the respective work transfer means being aligned to support a workpiece deposited thereon, and means for sequentially raising said work transfer means to dispose said work transfer means at the level of said work stations, lowering said rollers to deposit a workpiece carried thereby on said work transfer means, laterally shifting said work transfer means in horizontal straight line motion at the level of said work stations to a position in alignment with others of said rollers, raising said rollers to the level of said work station and lowering said work transfer means to deposit a work piece carried thereby on said others of said rollers whereby said workpiece is maintained at the level of said work station throughout the transfer operation.

5. The apparatus according to claim 4 together with means for adjusting the raised position of said rollers and said work transfer means.

References Cited in the file of this patent

UNITED STATES PATENTS

| | | |
|---|---|---|
| 1,260,260 | Harmon | Mar. 19, 1918 |
| 1,853,637 | Reiner | Apr. 12, 1932 |
| 2,210,531 | Engelbaugh | Aug. 6, 1940 |
| 2,381,441 | Drissner | Aug. 7, 1945 |
| 2,642,179 | Cross | June 16, 1953 |
| 2,728,253 | Gettig | Dec. 27, 1955 |
| 2,923,952 | Sawdey | Feb. 9, 1960 |
| 2,925,166 | Sawdey | Feb. 16, 1960 |